(12) United States Patent
Jung et al.

(10) Patent No.: US 7,272,090 B2
(45) Date of Patent: Sep. 18, 2007

(54) DEVICE AND METHOD FOR COMPENSATING FOR TILT

(75) Inventors: Soo-yul Jung, Gyeonggi-do (KR); Ju-wha Jin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/401,334

(22) Filed: Apr. 11, 2006

(65) Prior Publication Data

US 2006/0181976 A1    Aug. 17, 2006

Related U.S. Application Data

(62) Division of application No. 10/439,331, filed on May 16, 2003.

(30) Foreign Application Priority Data

May 17, 2002   (KR) ............................... 2002-27342

(51) Int. Cl.
*G11B 7/095* (2006.01)
(52) U.S. Cl. ................... 369/53.19; 369/44.32
(58) Field of Classification Search ..................... None
See application file for complete search history.

(56) References Cited

U.S. PATENT DOCUMENTS

| | | | |
|---|---|---|---|
| 5,898,654 A | 4/1999 | Shimada et al. ......... | 369/44.32 |
| 6,282,161 B1 * | 8/2001 | Son et al. ................ | 369/53.19 |
| 6,577,094 B2 | 6/2003 | Ohtsu et al. ............. | 369/44.11 |
| 6,674,707 B2 * | 1/2004 | Ogura et al. ............. | 369/59.22 |
| 6,791,927 B2 | 9/2004 | Yamanaka ............... | 369/53.19 |
| 6,845,067 B2 | 1/2005 | Ohtsu ...................... | 369/44.32 |
| 6,876,614 B2 | 4/2005 | Raaymekers ............. | 369/53.19 |
| 6,898,163 B2 | 5/2005 | Takeda .................... | 369/53.19 |
| 2002/0054549 A1 * | 5/2002 | Ohtsu ...................... | 369/44.32 |
| 2002/0080692 A1 | 6/2002 | Nagaoka et al. ......... | 369/44.32 |
| 2003/0142598 A1 | 7/2003 | Chou et al. .............. | 369/44.32 |
| 2003/0198160 A1 * | 10/2003 | Park et al. ............... | 369/53.19 |

FOREIGN PATENT DOCUMENTS

JP          60-055523          3/1985

(Continued)

*Primary Examiner*—William Korzuch
*Assistant Examiner*—Nathan Danielsen
(74) *Attorney, Agent, or Firm*—Staas & Halsey LLP

(57) ABSTRACT

A tilt compensating device and method of performing normal tilt compensation in the event of a servo emergency which may occur during reproduction of data from an optical recording medium are provided. The tilt compensating device includes: an optical pickup; a tilt adjusting unit that adjusts a tilt angle of the optical pickup; a jitter detecting unit that detects an amount of jitter in a reproduction signal output from the optical pickup; and a controlling unit that monitors speed at which the optical recording medium operates using a phase-locked loop (PLL) signal generated from the reproduction signal and the degree of focus of the optical pickup, performs an operation to return to a normal state if any abnormality occurs, and controls operation of the tilt adjusting unit by comparing an amount of jitter detected at regular intervals against a reference. The present invention provides more stable tilt compensation compared to a conventional approach controlling a tilt driver in real time while monitoring jitter, thus improving disk reproduction capability.

3 Claims, 6 Drawing Sheets

FOREIGN PATENT DOCUMENTS

| | | |
|---|---|---|
| JP | 63-213177 | 9/1988 |
| JP | 63-268133 | 11/1988 |
| JP | 02-218026 | 8/1990 |
| JP | 04-254921 | 9/1992 |
| JP | 06-325396 | 11/1994 |
| JP | 2001-093178 | 4/2001 |
| JP | 2001-195762 | 7/2001 |
| JP | 2001-195763 | 7/2001 |
| JP | 2002-050063 | 2/2002 |
| WO | WO 01/54125 A1 * | 7/2001 |

* cited by examiner

DEVICE AND METHOD FOR COMPENSATING FOR TILT

CROSS-REFERENCE TO RELATED APPLICATIONS

This is a Divisional Application of application Ser. No. 10/439,331 filed May 16, 2003, in the United States Patent and Trademark Office now pending which claims the priority of Korean Patent Application No. 2002-27342, filed on May 17, 2002, the disclosures of which are incorporated herein in their entirety by reference.

BACKGROUND OF THE INVENTION

1. Field of the Invention

The present invention relates to a device and method of reproducing data on an optical recording medium, and more particularly, to a tilt compensating device and method of performing normal tilt compensation in the event of a servo emergency which may occur during reproduction of data from an optical recording medium.

2. Description of the Related Art

In order to effectively read a signal from an optical recording medium, the recording surface of the optical recording medium must be maintained perpendicular to the optical axis of an optical pickup. A certain amount of tilting occurs during the process of manufacturing or using an optical recording medium, which makes it difficult to keep the recording surface of the optical recording medium perpendicular to a pickup. To compensate for this tilting, a tilt compensation device is used.

A tilt compensation device drives a tilt motor rotating the pickup in a forward or backward direction in response to a tilted state of a recording surface in a forward or backward direction so that an optical axis of the pickup is adjusted to be precisely vertical to the recording surface.

When a tilted optical recording medium is loaded into a reproducing apparatus, the optical recording medium forms a dish shape. In addition, when an emergency such as focus servo drop or spindle servo off occurs in a focus servo or a spindle servo, which are operated to compensate tilting by detecting jitter in real time, tilting during such an event adversely affects tilt compensation to make normal disk reproduction difficult.

SUMMARY OF THE INVENTION

The present invention provides a tilt compensating device performing stable tilt compensation when an emergency occurs in a servo.

The present invention also provides a tilt compensating method of performing stable tilt compensation when an emergency occurs in a servo.

According to an aspect of the present invention, a tilt compensating device in an apparatus utilizing an optical recording medium includes an optical pickup, a tilt driver that adjusts a tilt angle of the optical pickup, a jitter detector that detects an amount of jitter in a reproduction signal output from the optical pickup, and a controller that monitors speed at which the optical recording medium operates using a phase-locked loop (PLL) signal generated from the reproduction signal and the degree of focus of the optical pickup, performs an operation to return to a normal state if any abnormality occurs, and controls operation of the tilt driver by comparing an amount of jitter detected at regular intervals against a reference.

According to another aspect of the present invention, a tilt compensating method employed when utilizing an optical recording medium includes monitoring a speed at which the optical recording medium operates using output of a phase-locked loop (PLL) circuit that generates a PLL signal from a reproduction signal output from the optical recording medium, and a focus signal output from a focus circuit outputting the degree of focus between the optical recording medium and the optical pickup focus, and performing an operation to return to a normal state if any abnormality occurs, and comparing an amount of jitter detected at regular intervals during operation of the optical recording medium against a reference and performing tilt compensation so that jitter detected is minimized while performing the monitoring operation.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail preferred embodiments thereof with reference to the attached drawings in which.

DETAILED DESCRIPTION OF THE INVENTION

Figure 1:
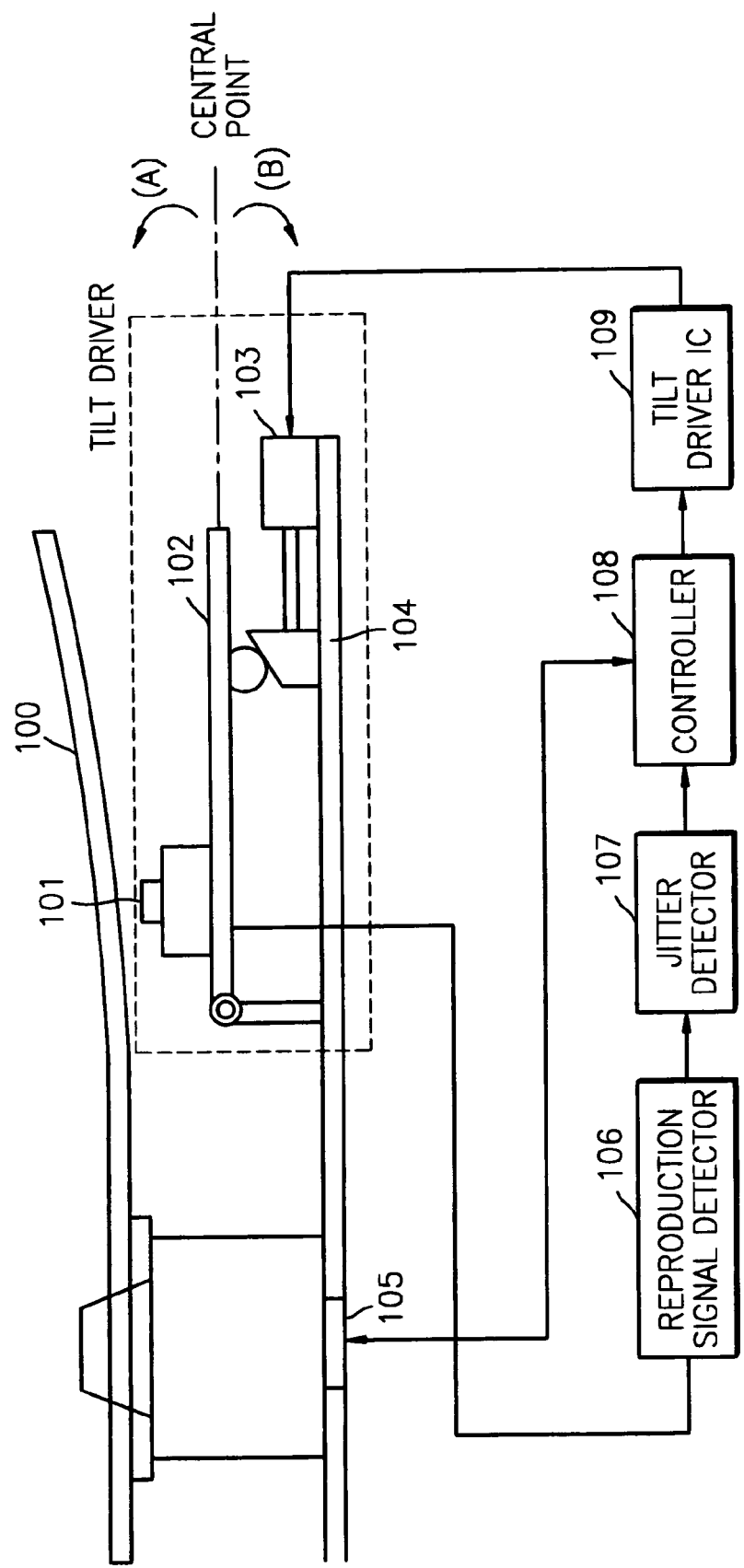
FIG. 1 is a block diagram showing the configuration of a tilt compensating device according to the present invention.

Embodiments of the present invention are described in more detail below and are illustrated in the attached drawings. Reference numerals are used to identify elements of the embodiments, with like reference numerals corresponding to like elements.

Referring to FIG. 1, which is a block diagram showing the configuration of a tilt compensating device according to the present invention, the tilt compensating device, which uses an optical disk 100, comprises an optical pickup 101, a guide 102, a tilt motor 103, a deck 104, a spindle motor 105, a reproduction signal detector 106, a jitter detector 107, a controller 108, and a tilt driver integrated circuit (IC) 109. In the present invention, a tilt driver comprises the optical pickup 101, the guide 102, the tilt motor 103, and the deck 104.

Figure 2:
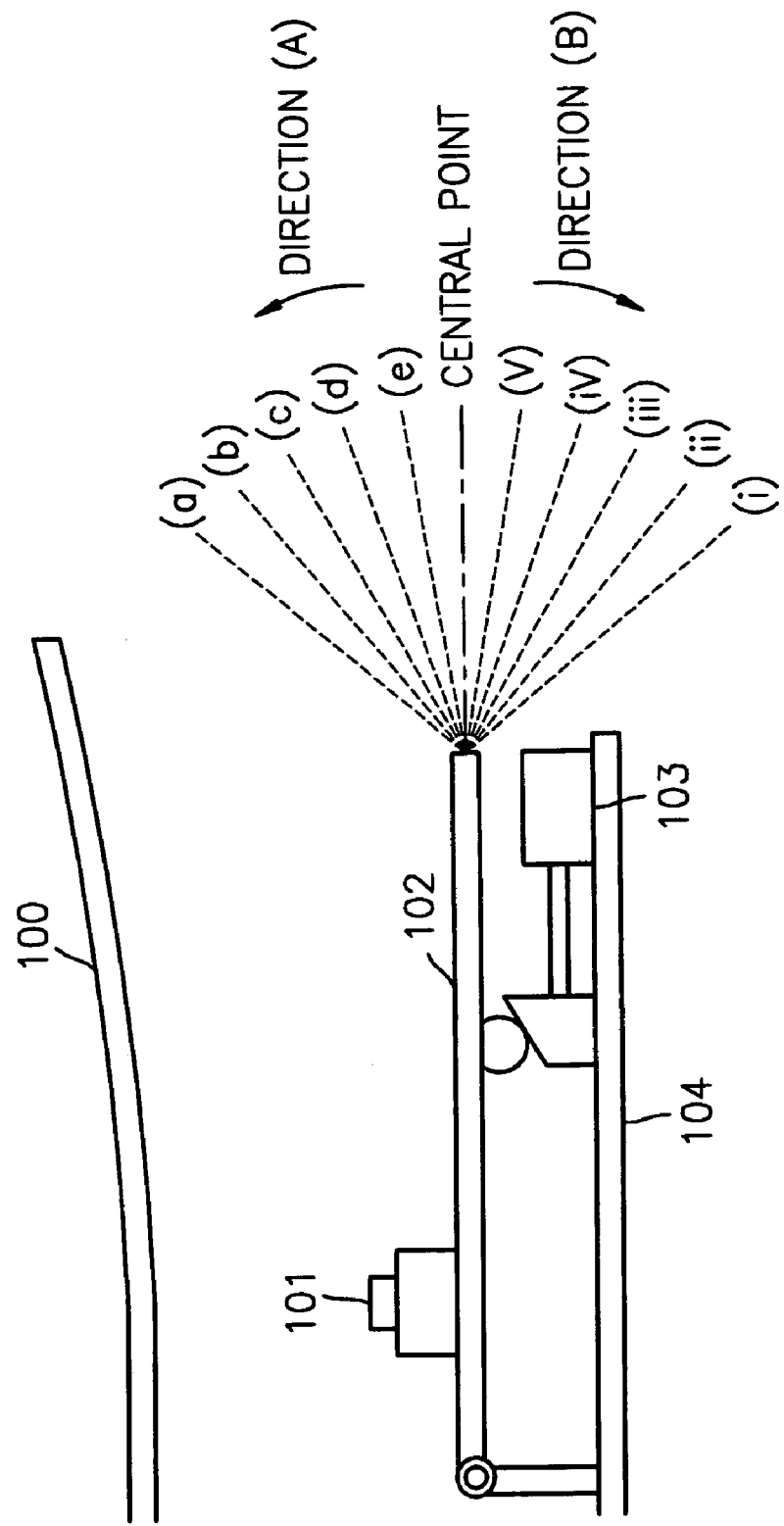
FIG. 2 shows a range in which a tilt driver is moved.
Figure 3:
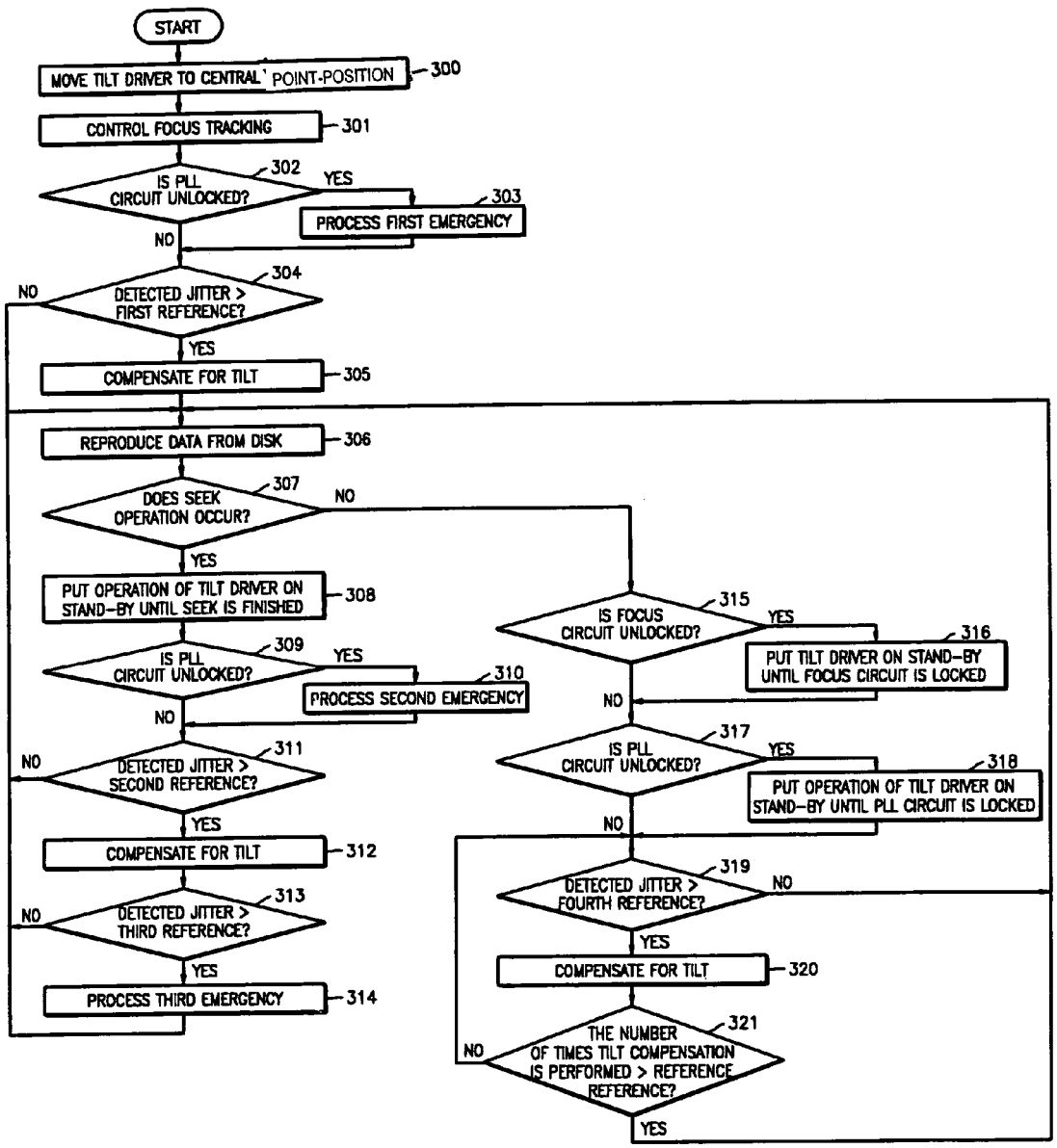
FIG. 3 is a flowchart showing a tilt compensating method according to an embodiment of the present invention.

FIG. 2 shows a range in which a tilt driver is moved. Referring to FIG. 3, which is a flowchart showing a tilt compensating method according to the present invention, the method comprises the operations of: moving a tilt driver to a central point of an operating range (operation 300), controlling focus tracking (operation 301), determining whether a PLL circuit is unlocked (operation 302), processing a first emergency (operation 303), determining whether the detected jitter is greater than a first reference value (operation 304), compensating a tilt (operation 305), reproducing data from a disk (operation 306), determining whether a seek operation occurs (operation 307), putting the operation of the tilt driver on stand-by until the seek operation is finished (operation 308), determining whether a PLL circuit is unlocked (operation 309), processing a second emergency (operation 310), determining whether the detected jitter is greater than a second reference value (operation 311), compensating a tilt (operation 312), determining whether the detected jitter is greater than a third reference value (operation 313), processing a third emergency (operation 314), determining whether a focus circuit is unlocked (operation 315), putting the operation of tilt driver on stand-by until the focus circuit is locked (operation 316), determining whether the PLL circuit is unlocked (operation 317), and if the PLL circuit is unlocked, stopping the operation of the tilt driver and putting it on stand-by until the PLL circuit is locked (operation 318), determining whether the detected jitter is greater than a fourth reference value (operation 319), compensating a tilt (operation 320), and determining whether the number of times tilt compensation has been performed exceeds an allowable number (operation 321).

Figure 4:
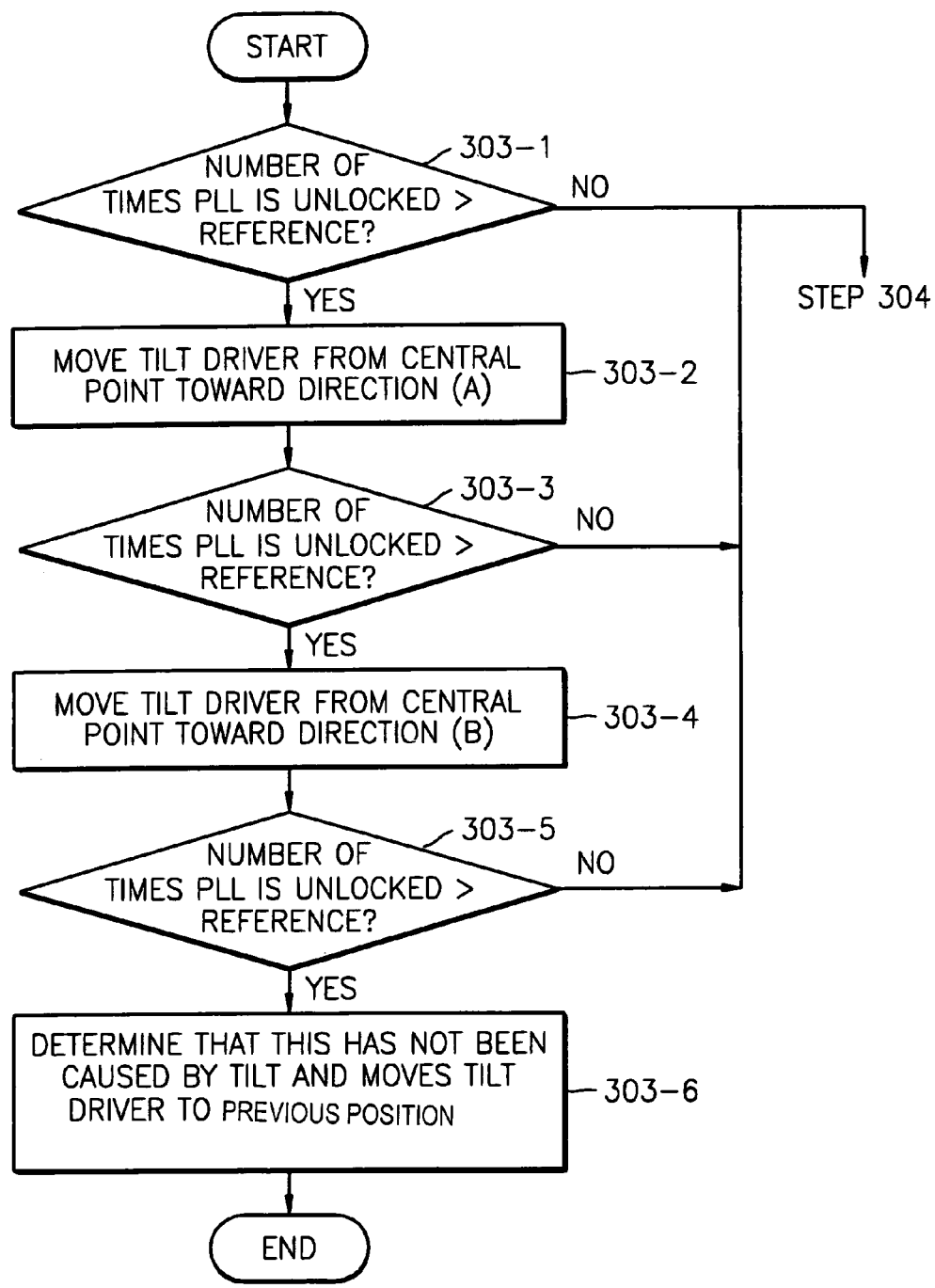
FIG. 4 is a flowchart showing operations performed according to a first emergency processing method in the method illustrated in FIG. 3.

FIG. 4 is a flowchart showing operations performed according to the first emergency processing method in the method illustrated in FIG. 3. Referring to FIG. 4, the first emergency processing method includes the operations of: determining whether the number of times the PLL circuit is unlocked exceeds an allowable number (operation 303-1); moving the tilt driver toward direction (A) from a central point of an operating range (operation 303-2); determining whether the number of times the PLL circuit is unlocked exceeds the allowable number (operation 303-3); moving the tilt driver toward direction (B) from the central point (operation 303-4); determining whether the number of times the PLL circuit is unlocked exceeds the allowable number (operation 303-5); and if so, determining that this is not caused by a tilt and moving the tilt driver to its previous position (operation 303-6).

Figure 5:
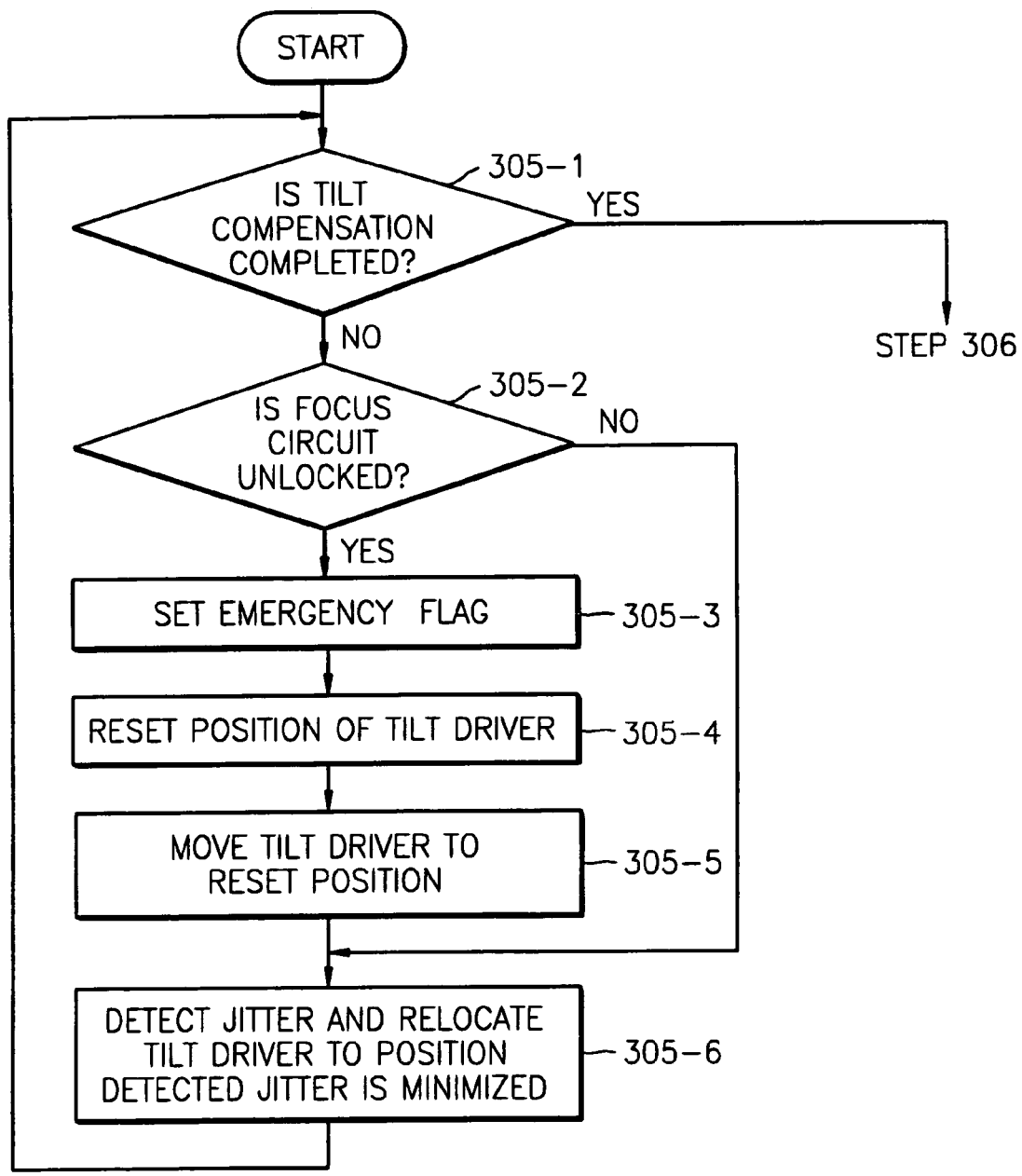
FIG. 5 is a flowchart showing operations performed according to a tilt compensation process in the method illustrated in FIG. 3.

FIG. 5 is a flowchart showing operations performed according to a tilt compensation process in the method illustrated in FIG. 3. Referring to FIG. 5, the tilt compensating process includes the operations of: determining whether tilt compensation is completed (operation 305-1); determining whether a focus circuit is unlocked (operation 305-2); setting an emergency flag (operation 305-3); resetting the position to which the tilt driver is to be moved (operation 305-4); moving the tilt driver to the reset position (operation 305-5); and detecting a jitter and relocating the tilt driver to a position at which a jitter value is minimum (operation 305-6).

Figure 6:
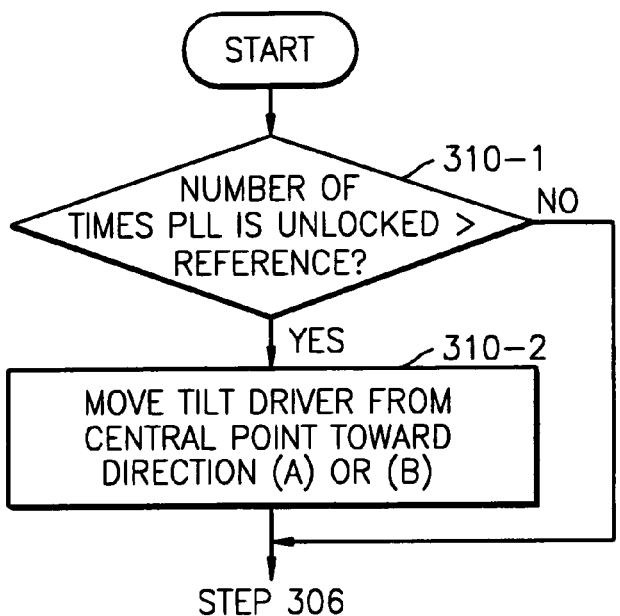
FIG. 6 is a flowchart showing operations performed according to a second emergency processing method in the method illustrated in FIG. 3.

Referring to FIG. 6, which is a flowchart showing operations performed according to the second emergency processing method in the method illustrated in FIG. 3, the second emergency processing method includes the operations of: determining whether the number of times the PLL circuit is unlocked exceeds an allowable number (operation 310-1); and moving the tilt driver toward direction (A) or (B) from the central point (operation 310-2).

Figure 7:
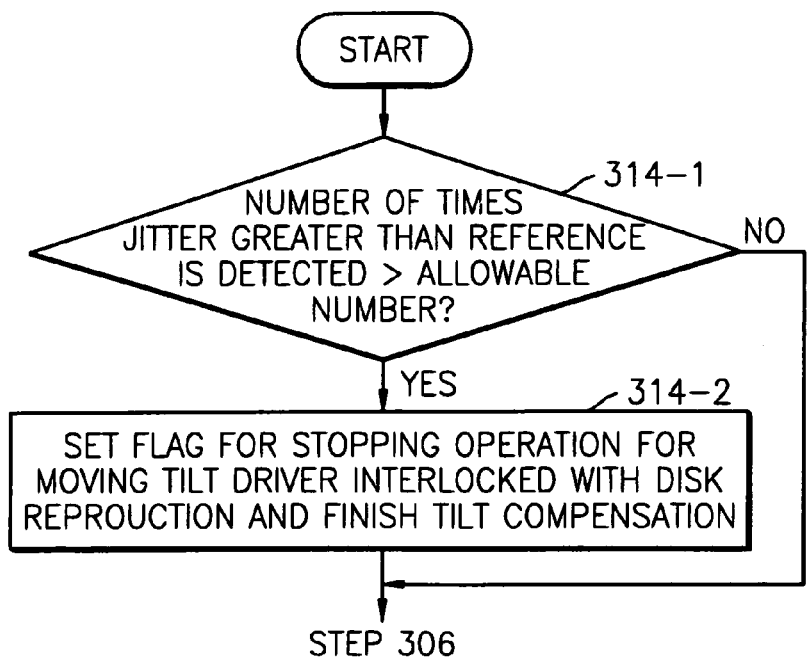
FIG. 7 is a flowchart showing operations performed according to a third emergency processing method in the method illustrated in FIG. 3.

Referring to FIG. 7, which is a flowchart showing operations performed according to the third emergency processing method in the method illustrated in FIG. 3, the third emergency processing method includes the operations of: determining whether the number of times a jitter greater than a reference value is detected exceeds an allowable number (operation 314-1); and setting a flag stopping the operation moving the tilt driver interlocked with disk reproduction and finishing tilt compensation (operation 314-2).

A tilt compensating device according to the present invention will now be described with references to FIGS. 1 and 2. When the tilted optical disk 100 is loaded into a reproducing apparatus, the tilted optical disc 100 forms a dish shape. The optical pickup 101 reads a signal from the optical disk 100. Once the optical disk 100 has been mounted into the reproducing apparatus, the optical pickup 101 is positioned in a lead-in area on the optical disk 100, and the tilt driver is located at a central point of an operating range. Here, the operating range refers to one in which the guide 102 can be moved up and down, and the central point of the operating range refers to the midpoint between the upper and lower limits of the motion of the guide 102. When the tilt driver is positioned at the central point of the operating range, focus tracking is optimally controlled.

According to an embodiment of this invention, tilt compensation is performed by detecting jitter before data on the optical disk 100 is reproduced or during reproduction from the optical disk 100. Here, "before data on the optical disk 100 is reproduced" refers to a state in which an image is not displayed on a screen but the optical disk 100 operates, and "during reproduction from the optical disk 100" refers to a state in which an image is displayed on the screen.

First, tilt compensation performed before data on the optical disk 100 is reproduced will now be described. The optical pickup 101 reads signals from the operating optical disk 100, and the reproduction signal detector 106 detects only a reproduction signal among the signals read from the optical disk 100. The jitter detector 107 detects an amount of jitter from the reproduction signal detected by the reproduction signal detector 106. The jitter detector 107 has a PLL circuit (not shown) to output a PLL signal from the reproduction signal. The jitter detector 107 also has a focus circuit (not shown) to output the degree of focus between the optical disk 100 and the optical pickup 101 from the reproduction signal. The output signal of the PLL circuit, the output signal of the focus circuit, and the amount of jitter detected are input to the controller 108. The controller 108 monitors the PLL circuit and determines whether the PLL circuit is unlocked. The PLL signal output from the PLL circuit is used to determine whether the speed of a spindle motor 105 rotating the optical disk 100 deviates from a specific speed. When the PLL circuit is unlocked, it means that the spindle motor 105 rotates at a speed that deviates from normal speed. In contrast, when the PLL circuit is locked, it means that the spindle motor 105 rotates at normal speed. The controller 108 determines any abnormality in the spindle motor 105 from a lock or unlock signal received from the PLL circuit. For example, if the PLL circuit is unlocked, the controller 108 recognizes this as a first emergency and performs processing for this emergency. The optical disk 100 used when the PLL circuit is unlocked before initial tilt compensation typically has a large amount of tilt along its inner circumference. Thus, if the number of times the PLL circuit is unlocked exceeds an allowable number, the controller 108 forces the tilt driver to move in the direction (A) from the center (to position (d) or (c) in FIG. 2). As shown in FIGS. 1 and 2, the direction (A) is away from the deck 104, while the direction (B) is toward the deck 104. A movable range of the tilt drive is between positions of maximum rotation in the directions (A) and (B). After having forced the tilt driver to move in the direction (A), if the number of times a PLL signal is less than a reference value exceeds an allowable number, the tilt driver is forcibly moved in the direction (B) from the center (to position (iv) or (iii) in FIG. 2). Then, if the number of times the PLL signal is less than the reference value exceeds the allowable number, the controller 108 determines that this is not caused by tilt and moves the tilt driver to the previous position. Thereafter, the controller 108 compares the jitter detected by the jitter detector 107 against a reference and performs tilt compensation.

Although not shown in the drawings, the controller 108 comprises: a monitoring unit monitoring speed at which the optical disk 100 rotates or operates using the output of the PLL circuit which generates a PLL signal from the reproduction signal, and signals output from the focus circuit indicating the degree of focus between the optical disk 100 and the optical pickup 101; a storage unit storing reference amount of jitter which may occur during operation of the optical disk 100; a comparison unit comparing an amount of jitter detected by the jitter detector 107 against the reference amount of jitter stored in the storage unit; and a controlling unit controlling the operation of the PLL circuit and/or the focus circuit so that they are locked if one of them is determined to be unlocked as a result of monitoring by the monitoring unit, and controlling the operation of the tilt driver according to the comparison result from the comparison unit when the PLL circuit and focus circuit are locked.

When determining that the jitter detected by the jitter detector 107 is greater than the reference and then performing tilt compensation, the controller 108 determines whether the focus circuit is unlocked. The problem of the focus circuit being unlocked occurs commonly. This refers to a state in which a focus gets unlocked so that the image on the screen wavers, or the optical disk 100 ceases to operate, and this state is normally caused by a failure to recover from a lock failure of the focus circuit when the tilt driver is moved to an interval where the focus circuit is unlocked. If it is unlocked, the controller 108 internally sets an emergency flag and resets the position of the tilt driver. Where the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit is unlocked. Similarly, if the tilt driver operates in the direction (B), the controller 108 resets the minimum driving value of the tilt driver from position (i) to position (ii). In this case, the tilt driver can be moved only in the range from position (ii) to position (v). The controller 108 moves the tilt driver to a reset position, transmits a tilt compensation signal that minimizes an amount of jitter detected at the reset position to the tilt driver IC 109 which in turn puts the tilt driver into operation.

Tilt compensation performed by detecting jitter during reproduction from the optical disk 100 will now be described. After having conducted tilt compensation before data on the optical disk 100 is reproduced, once reproduction from the optical disk 100 is in progress, the controller 108 monitors the jitter of a reproduction signal at regular time intervals. When data on the optical disk 100 is reproduced, jitter varies continuously. Reproduction of data from the optical disk 100 is divided into ordinary reproduction and reproduction using Seek/Chapter Search (hereinafter called "Seek") which skips tracks above a value preset by the user's command.

When a seek operation occurs, the controller 108 stops the operation of the tilt driver and stands by until the seek operation is finished. When the seek operation is finished, the controller 108 determines whether the PLL circuit is unlocked. The controller 108 judges any abnormality of the spindle motor 105 from a PLL signal output from the PLL circuit. If the PLL circuit is unlocked, the controller 108 recognizes this as a second emergency and performs processing for the second emergency. Situations such as the second emergency may occur mostly on dish-shaped tilted disks. When the number of times the PLL circuit is unlocked continuously in the second emergency exceeds an allowable number, the controller 108 determines that this has been caused by a tilt. The controller 108 moves the tilt driver in the directions (A) and (B) when the seek operation is performed on outer and inner circumferences of the optical disk 100, respectively.

After processing the second emergency, the controller 108 performs tilt compensation on a target track. The controller 108 compares a jitter amount detected on the target track against a reference stored in the storage unit. If the detected jitter amount is greater than the reference, the controller 108 determines that tilt compensation is required. Before performing tilt compensation, the controller 108 determines the initial direction in which the tilt driver will be moved. If the optical disk 100 is moved above a preset value along the outer circumference of a track, the controller 108 controls the tilt driver so that it may be moved in the direction (A) from the central point. On the other hand, if the optical disk 100 is moved above a preset value along the inner circumference of a track, the controller 108 controls the tilt driver so that it may be moved in the direction (B) from the center. After determining the initial direction in which the tilt driver is moved in this way, the controller 108 starts tilt compensation.

Once the tilt compensation starts, the controller 108 senses the focus circuit which outputs the degree of focus between the optical disk 100 and the optical pickup and determines whether the focus circuit is unlocked. If it is unlocked, the controller 108 internally sets an emergency flag and resets the position of the tilt driver. Where the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit drops. In the same manner, if the tilt driver operates in the direction (B), the controller 108 resets the minimum driving value of the tilt driver from position (i) to position (ii). In this case, the tilt driver can be moved only in the range from position (ii) to position (v). The controller 108 moves the tilt driver to a reset position, transmits a tilt compensation signal that minimizes an amount of jitter detected at the reset position to the tilt driver IC 109 which in turn drives the tilt driver. Once the tilt compensation has been completed, reproduction of data from the optical disk 100 resumes.

After tilt compensation, jitter is continuously detected. If the detected jitter exceeds a reference level, the controller 108 recognizes this as a third emergency, and performs processing for this emergency. The third emergency occurs when the tilt driver excessively operates during output of a reproduced screen image following a seek operation, due to high level of overall jitter, so that the reproduced screen image wavers. The third emergency occurs more frequently when the optical pickup 101 vibrates after a seek operation and a high amount of jitter is momentarily measured, due to defects on a target track. In this case, the controller 108 determines whether the number of times jitter greater than a reference value is detected exceeds an allowable number, sets a flag so that the tilt driver cannot operate any more in the current operation, and displays a reproduced screen after tilt compensation is finished.

When data on the optical disk 100 is reproduced by an ordinary method without a seek operation, the controller 108 determines whether the focus circuit is unlocked, and if the focus circuit is unlocked, stops the operation of the tilt driver and puts it on stand-by until the focus circuit is locked. Similarly, the controller 108 determines whether the PLL circuit is unlocked, and if the PLL circuit is unlocked, stops the operation of the tilt driver and puts it on stand-by until the PLL circuit is locked. Once the focus circuit and the PLL circuit have been normally locked, the optical pickup 101 reads signals from the optical disk 100, and the reproduction signal detector 106 detects only a reproduction signal among the signals read from the optical pickup 101. The jitter detector 107 detects an amount of jitter in the reproduction signal detected by the reproduction signal detector 106. The detected amount of jitter is input to the controller 108. The controller 108 compares the amount of jitter detected against a reference amount of jitter stored in the storage unit at regular intervals, and if the former is greater than the latter, senses tilt compensation. Before performing tilt compensation, the controller 108 determines the initial direction in which the tilt driver will be moved. If data on the optical disk 100 is reproduced continuously along the outer circumference of a track, the controller 108 controls the tilt driver so that it may be moved in the direction (A) from the central point. On the other hand, if data on the optical disk 100 is reproduced continuously along the inner circumference of a track, the controller 108 controls the tilt driver so that it may be moved in the direction (B) from the center. After determining the initial direction in which the tilt driver is moved in this way, the controller 108 starts tilt compensation.

Once the tilt compensation begins, the controller 108 determines whether the focus circuit is unlocked. If it is unlocked, the controller 108 internally sets an emergency flag and resets the position of the tilt driver. When the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit is unlocked. Similarly, if the tilt driver operates in the direction (B), the controller 108 resets the minimum driving value of the tilt driver from position (i) to position (ii). In this case, the tilt driver can be moved only in the range from position (ii) to position (v). The controller 108 moves the tilt driver to a reset position, transmits a tilt compensation signal that minimizes an amount of jitter detected at the reset position to the tilt driver IC 109, which in turn drives the tilt driver. Once the tilt compensation has been completed, reproduction of data from the optical disk 100 resumes.

On disks having a high jitter without respect to the presence of tilt, the number of times tilt compensation is performed exceeds an allowable number after tilt compensation has been performed in this way. Thus, in this case, reproduction of data from the optical disk 100 is performed.

A tilt compensating method will now be described with reference to FIG. 3. According to the method, first, the tilt driver is moved to a central point of its operating range (operation 300). Once the optical disk 100 has been loaded into a reproducing apparatus, the optical pickup 101 is positioned in a lead-in area at the beginning of each session on the optical disk 100, and the tilt driver is located at a central point of its operating range. Here, the operating range refers to one in which the guide 102 can be moved up and down, and the central point of the operating range refers to the midpoint between the upper and lower limits of the range of the motion of the guide 102. When the tilt driver is positioned at the central point of its operating range, focus tracking is optimally controlled (operation 301).

Once the focus tracking has been optimally controlled, the controller 108 determines whether the PLL circuit is unlocked (operation 302). An unlock or lock signal of the PLL circuit is detected by the jitter detector 107. A reproduction signal detected by the reproduction signal detector 106 is input to the jitter detector 107, and the jitter detector 107 has a PLL circuit (not shown) to output a PLL signal from the reproduction signal. The detected PLL unlock or lock signal is used to determine whether the speed of the spindle motor 105 rotating the optical disk 100 deviates from a specific speed.

If the PLL circuit is unlocked, the controller 108 recognizes this as a first emergency and processes this emergency (operation 303). A method of processing the first emergency will now be described in detail with reference to FIG. 4. The optical disk 100 applied when the PLL circuit is unlocked before initial tilt compensation typically has a large amount of tilt along its inner circumference. According to the first emergency processing method, the controller 108 determines whether the number of times the PLL circuit is unlocked exceeds an allowable number (operation 301-1). If the number of times the PLL circuit is unlocked exceeds the allowable number, the controller 108 forces the tilt driver to move in the direction (A) from the center (to position (d) or (c) in FIG. 2) (operation 303-2). As shown in FIGS. 1 and 2, the direction (A) is away from the deck 104. A movable range in the direction (A) has a fixed maximum limit. After forcibly moving the tilt driver in the direction (A), the controller 108 determines again whether the number of times the PLL circuit is unlocked exceeds the allowable number (operation 303-3). If the number of times the PLL circuit exceeds the allowable number, the controller 108 forces the tilt driver to move in the direction (B) from the center (to position (iv) or (iii) in FIG. 2) (operation 303-4). After forcibly moving the tilt driver in the direction (B), the controller 108 determines again whether the number of times the PLL circuit is unlocked exceeds the allowable number (operation 303-5). Then, if the number of times the PLL circuit is unlocked exceeds the allowable number, the controller 108 determines that this has not been caused by tilt and moves the tilt driver to the previous position (operation 303-6).

After processing the first emergency, the controller 108 compares the jitter detected by the jitter detector 107 against a first reference, and if the detected jitter is greater than the first reference, performs tilt compensation (operations 304 and 305). The jitter detector 105 detects an amount of jitter in the reproduction signal. The detected jitter is input to the controller 108. The controller 108 compares the amount of jitter detected on the optical disk 100 against a reference jitter (first reference) stored in itself. If the former is greater than the latter, the controller 108 performs tilt compensation. The tilt compensating (operation 305) will now be described with reference to FIG. 5.

The tilt compensation method shown in FIG. 5 is applied to all tilt compensation operations in embodiments of this invention. The controller 108 determines whether tilt compensation is completed (operation 305-1). If tilt compensation has not yet been completed, the controller 108 determines whether the focus circuit that outputs the degree of focus between the optical disk 100 and the optical pickup 101 is unlocked (operation 305-2). If it is unlocked, the controller 108 internally sets an emergency flag (operation 305-3). After setting the emergency flag, the controller 108 resets the position of the tilt driver (operation 305-4). When the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit is unlocked. Similarly, if the tilt driver operates in the direction (B), the controller 108 resets the minimum driving value of the tilt driver from position (i) to position (ii). In this case, the tilt driver can be moved only in the range from position (ii) to position (v). After resetting the position where the tilt driver is to be moved, the controller 108 moves the tilt driver to a reset position (operation 305-5). The controller 108 performs tilt compensation to relocate the tilt driver to a position where an amount of jitter detected is minimized (operation 305-6).

Once the tilt compensation has been completed, focus tracking is controlled, and data recorded on the optical disk 100 is reproduced (operation 306). During reproduction of data from the optical disk 100, the controller 108 monitors the jitter of the reproduction signal at regular time intervals. When data on the optical disk 100 is reproduced, jitter varies continuously.

The controller 108 determines whether a seek operation occurs, and if the seek operation occurs, the controller puts the operation of the tilt driver on stand-by until the seek operation is finished (operations 307 and 308). In the event of skipping tracks on the optical disk 100 above a value preset by the user's command ("Seek"), the operation of the tilt driver is paused until the optical pickup 101 reaches a target track.

When the seek operation is finished, the controller 108 determines whether the PLL circuit is unlocked (operation 309). The controller 108 judges any abnormality of the spindle motor 105 from the unlock or lock signal received from the PLL circuit.

If the PLL circuit is unlocked, the controller 108 recognizes this as a second emergency and processes the second emergency (operation 310). A method of processing the second emergency will now be described in detail with reference to FIG. 6. Situations such as the second emergency may occur mostly on dish-shaped tilted disks. When the number of times the PLL circuit is unlocked continuously in the second emergency exceeds an allowable number, the controller 108 determines that this has been caused by a tilt (operation 310-1). The controller 108 moves the tilt driver in the direction (A) when the seek operation is performed near the outer circumference of the optical disk 100, or moves the tilt driver in the direction (B) when the seek operation is performed near the inner circumference of the optical disk 100 (operation 310-2).

After processing the second emergency, the controller 108 compares jitter amount detected on a target track against a second reference stored in the storage unit, and if the detected jitter amount is greater than the second reference, the controller 108 performs tilt compensation (operations 311 and 312). Before performing tilt compensation, the controller 108 determines the initial direction in which the tilt driver will be moved. If the optical disk 100 is moved to above a preset value along the outer circumference of a track, the controller 108 controls the tilt driver so that it may be moved in the direction (A) from the central point. On the other hand, if the optical disk 100 is moved to above a preset value along the inner circumference of a track, the controller 108 controls the tilt driver so that it may be moved in the direction (B) from the center. After determining the initial direction in which the tilt driver is moved in this way, the controller 108 starts tilt compensation. The tilt compensation (operation 312) will now be described in detail with reference to FIG. 5, which describes the tilt compensation operation 305. Since operations described in 305 are identical to those of operation 312, in this case, for easy understanding, reference number 312 is used instead of 305 as shown in the drawing.

The controller 108 determines whether tilt compensation is completed (operation 312-1). If tilt compensation has not yet been completed, the controller 108 determines whether the focus circuit is unlocked (operation 312-2). If it is unlocked, the controller 108 internally sets an emergency flag (operation 312-3). After setting the emergency flag, the controller 108 resets the position of the tilt driver (operation 312-4). When the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit is unlocked. Similarly, if the tilt driver operates in the direction (B), the controller 108 resets the minimum driving value of the tilt driver from position (i) to position (ii). In this case, the tilt driver can be moved only in the range from position (ii) to position (v). After resetting the position where the tilt driver is to be moved, the controller 108 moves the tilt driver to a reset position (operation 312-5). The controller 108 performs tilt compensation to relocate the tilt driver to a position where an amount of jitter detected is minimized (operation 312-6).

After tilt compensation, jitter is continuously detected. If the detected jitter exceeds a reference level, the controller 108 recognizes this as a third emergency, and processes the third emergency (operations 313 and 314). A method of processing the third emergency will now be described in detail with reference to FIG. 7. The third emergency occurs when the tilt driver excessively operates during output of a reproduced screen image following a seek operation, due to a high level of overall jitter, so that the reproduced screen image wavers. The third emergency occurs more frequently when the optical pickup 101 vibrates after the seek operation and a high amount of jitter is momentarily measured due to defects on a target track. In this case, the controller 108 determines whether the number of times jitter greater than a reference is detected exceeds an allowable number (operation 314-1). If the former exceeds the latter, the controller 108 sets a flag so that the tilt driver cannot operate any more in the current operation, and displays a reproduced screen after tilt compensation is finished (operation 314-2).

If the optical disk 100 is reproduced by an ordinary method without a seek operation, the controller 108 determines whether the focus circuit is unlocked and if the focus circuit is unlocked, stops the operation of the tilt driver and puts it on stand-by until the focus circuit is locked (operations 315 and 316). The controller 108 also determines whether the PLL circuit is unlocked, and if the PLL circuit is unlocked, stops the operation of the tilt driver and puts it on stand-by until the PLL circuit is locked (operations 317 and 318).

Once the focus circuit and the PLL circuit have been normally locked, the controller 108 compares the amount of jitter detected at regular time intervals during reproduction of the optical disk 100 against a fourth reference stored in the storage unit, and if the former is greater than the latter, determines that tilt compensation is required. Before performing tilt compensation, the controller 108 determines the initial direction in which the tilt driver will be moved. If the optical disk 100 is reproduced continuously along the outer circumference of a track, the controller 108 controls the tilt driver so that it may be moved in the direction (A) from the central point. On the other hand, if the optical disk 100 is reproduced continuously along the inner circumference of a track, the controller 108 controls the tilt driver so that it may be moved in the direction (B) from the center. After determining the initial direction in which the tilt driver is moved in this way, the controller 108 starts tilt compensation. The tilt compensation (operation 320) will now be described in detail with reference to FIG. 5. In this case, for easy understanding, reference number 320 is used instead of 305 in the drawing.

The controller 108 determines whether tilt compensation is completed (operation 320-1). If tilt compensation has not yet been completed, the controller 108 determines whether the focus circuit is unlocked (operation 320-2). If it is unlocked, the controller 108 internally sets an emergency flag (operation 320-3). After setting the emergency flag, the controller 108 resets the position of the tilt driver (operation 320-4). Where the tilt driver operates in the direction (A), the controller 108 resets the maximum driving value of the tilt driver from position (a) to position (b). If the maximum value is reset in this way, the tilt driver can be moved only in the range from position (b) to position (e). This prevents the tilt driver from moving to a position where the focus circuit is unlocked. Similarly, if the tilt driver operates in the direction (B), the controller 108 resets the minimum driving value of the tilt driver from position (i) to position (ii). In this case, the tilt driver can be moved only in the range from position (ii) to position (v). After resetting the position where the tilt driver is to be moved, the controller 108 moves the tilt driver to a reset position (operation 320-5). The controller 108 performs tilt compensation to relocate the tilt driver to a position where an amount of jitter detected is minimized (operation 320-6).

After having performed tilt compensation in this way, the controller 108 determines whether the number of times tilt compensation is performed exceeds an allowable number (operation 321). On disks having a high jitter without respect to the presence of tilt, the number of times tilt compensation is performed may exceed an allowable number after tilt compensation has been performed in this way. Thus, in this case, reproduction of data from the optical disk 100 is performed.

The present invention provides more stable tilt compensation compared to a conventional approach controlling a tilt driver in real time while monitoring jitter, thus improving disk reproduction capability.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A method of compensating tilt with a tilt adjuster in an optical recording device that uses a phase-locked loop to monitor speed of an optical recording medium, comprising:
   obtaining a first count of a number of times of unlocking of the phase-locked loop circuit;
   moving the tilt adjuster in a first direction from an original position to a first position if the first count of the number of times of unlocking of the phase-locked loop circuit is greater than an allowable number of times;
   obtaining a second count of the number of times of unlocking of the phase-locked loop circuit;
   moving the tilt adjuster to a second position in a second direction opposing the first direction if the second count of the number of times of unlocking of the phase-locked loop is greater than the allowable number of times;
   obtaining a third count of the number of times of unlocking of the phase-locked loop circuit; and
   resetting the tilt adjuster back to the original position if the third count of the number of times of unlocking of the phase-locked loop is greater than the allowable number of times.

2. The method of claim 1, wherein the original position comprises a central position and the tilt adjuster moves in the first direction from the central position or in the second direction from the central position.

3. The method of claim 1, further comprising: resetting the tilt adjuster to the original position prior to the moving the tilt adjuster to the second position.

* * * * *